United States Patent [19]

Rae

[11] 4,176,473
[45] Dec. 4, 1979

[54] BOOK WITH REMOVABLE THREE DIMENSIONAL FIGURINES

[76] Inventor: Donald A. Rae, P.O. Box 51, Jenkintown, Pa. 19046

[21] Appl. No.: 852,801

[22] Filed: Nov. 18, 1977

[51] Int. Cl.² .......................................... G09B 19/00
[52] U.S. Cl. ................................... 35/35 E; 35/8 R; 46/34; 281/15 R
[58] Field of Search ................... 35/35 E, 26, 27, 28, 35/8 R; 46/34, 35, 36, 37; 206/472, 473, 475, 485, 486, 488, 489, 490; 281/15 R; 283/63 R, 63 A

[56] References Cited

U.S. PATENT DOCUMENTS

| | | | |
|---|---|---|---|
| 556,467 | 3/1896 | Koerner | 35/35 E |
| 1,028,921 | 6/1912 | Wagner | 283/63 R |
| 1,033,576 | 7/1912 | Garman | 46/35 |
| 1,405,134 | 1/1922 | Hoyme | 35/35 E |
| 1,935,353 | 11/1933 | Coventry | 35/26 |
| 2,538,085 | 1/1951 | Cotton | 35/8 R |
| 2,548,043 | 4/1951 | Muhlhauser | 35/35 E X |
| 2,731,766 | 1/1956 | Rubin | 46/35 |
| 2,848,823 | 8/1958 | Washburn | 35/35 E |
| 2,946,137 | 7/1960 | Worth et al. | 35/35 E |
| 3,212,638 | 10/1965 | Tomlinson | 206/489 |

FOREIGN PATENT DOCUMENTS

658184 4/1965 Belgium .................................. 281/15 R

OTHER PUBLICATIONS

*Book Production Industry*, Dec. 1966, pp. 41, 42, "NCA-R-A New Plastic Paper with Many Uses".

Primary Examiner—William H. Grieb
Attorney, Agent, or Firm—Weiser, Stapler & Spivak

[57] ABSTRACT

A multi-page book containing removable, three dimensional figures is disclosed. The figures may be fabricated of molded plastic in known manner and are suitably configured to be frictionally held within the pages of the book. Areas of the pages can be imprinted with descriptive or educational material relating to the adjacent figures to form a storybook which utilizes three dimensional representations of the subject matter presented to enforce learning and increase reader interest. The book is designed to removably engage the three dimensional figures within its pages. The engagement of the figures within the pages permits removal of the figures to thereby allow them to be used either as toys separate from the book or as reinforcement aids for the learning process.

10 Claims, 9 Drawing Figures

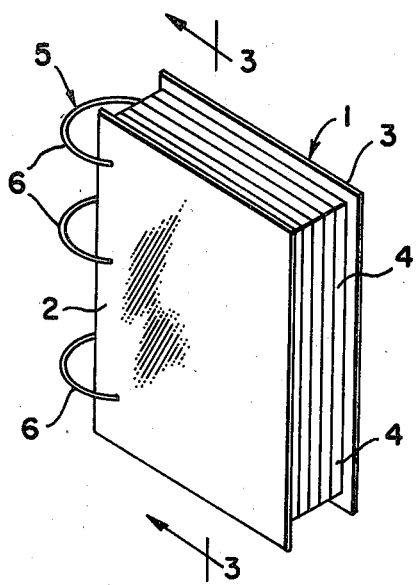
FIG. 1
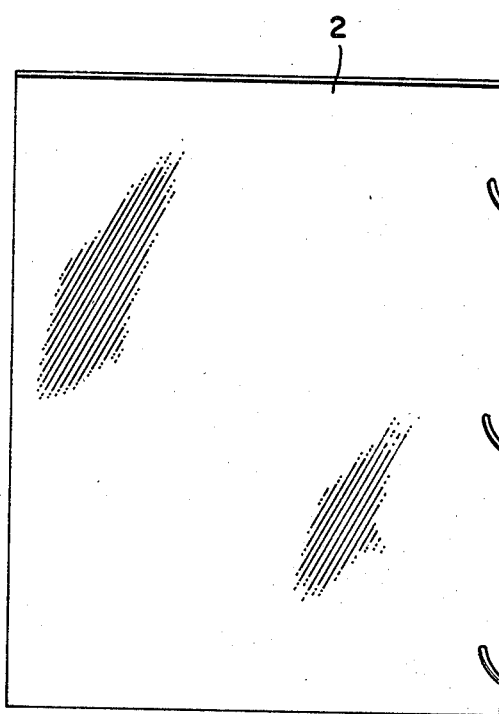
FIG. 2
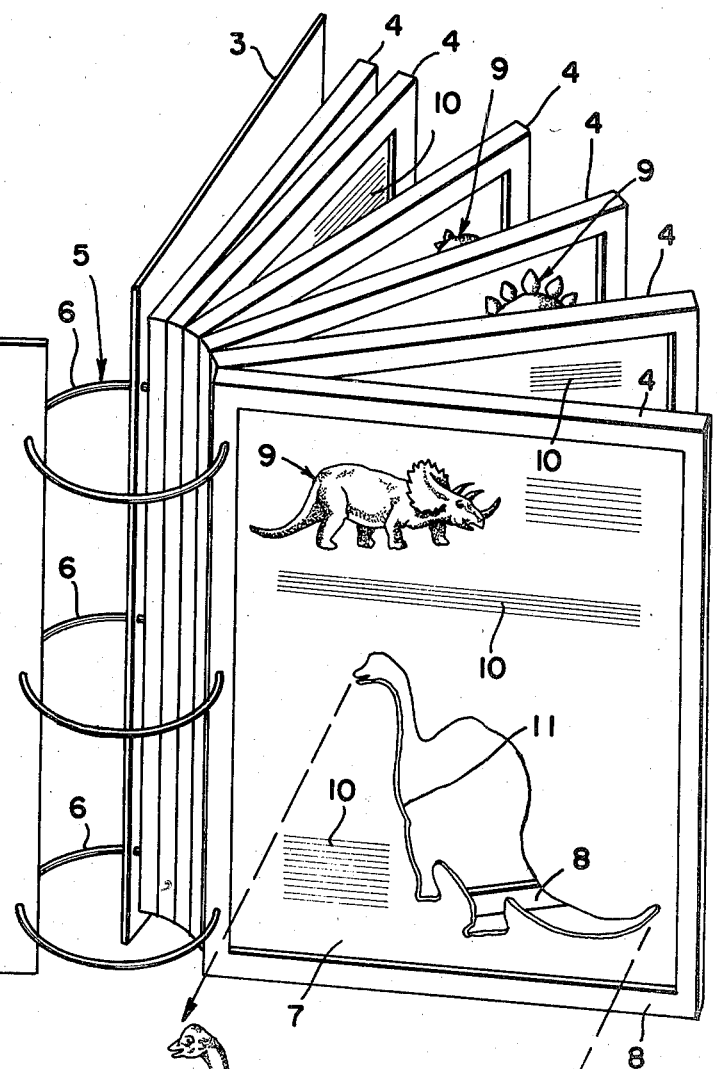
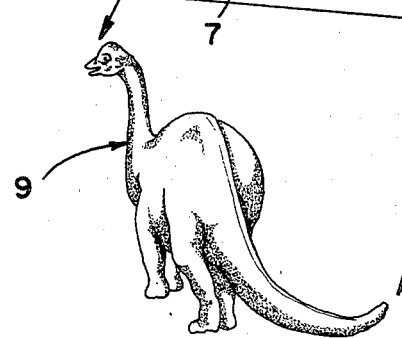

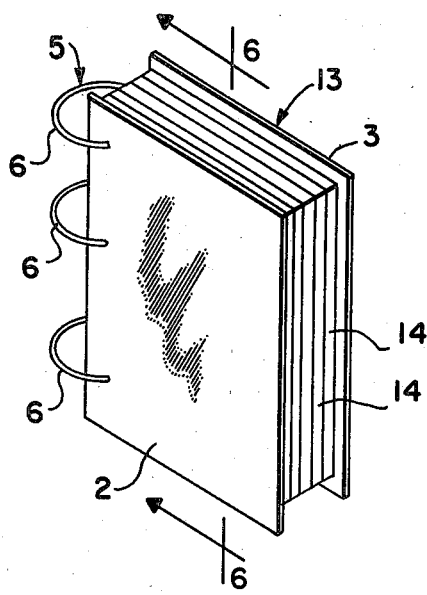
FIG. 4
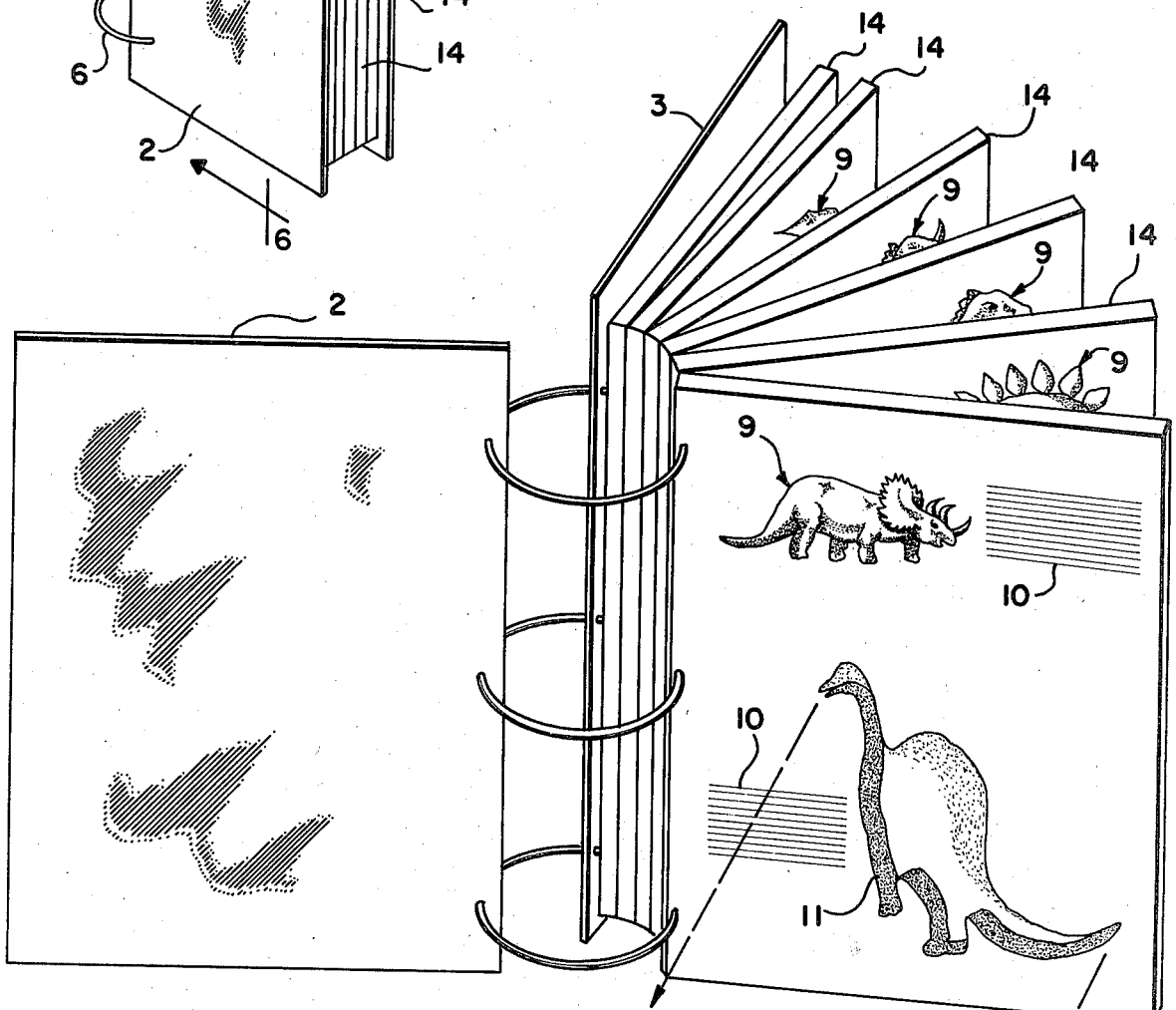
FIG. 5
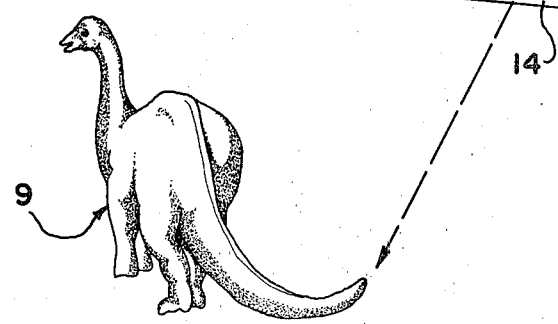

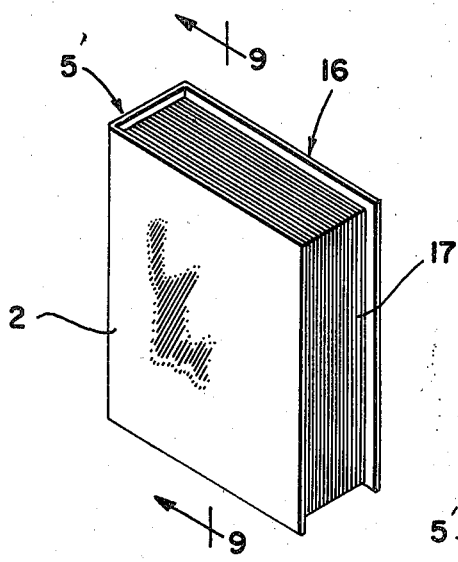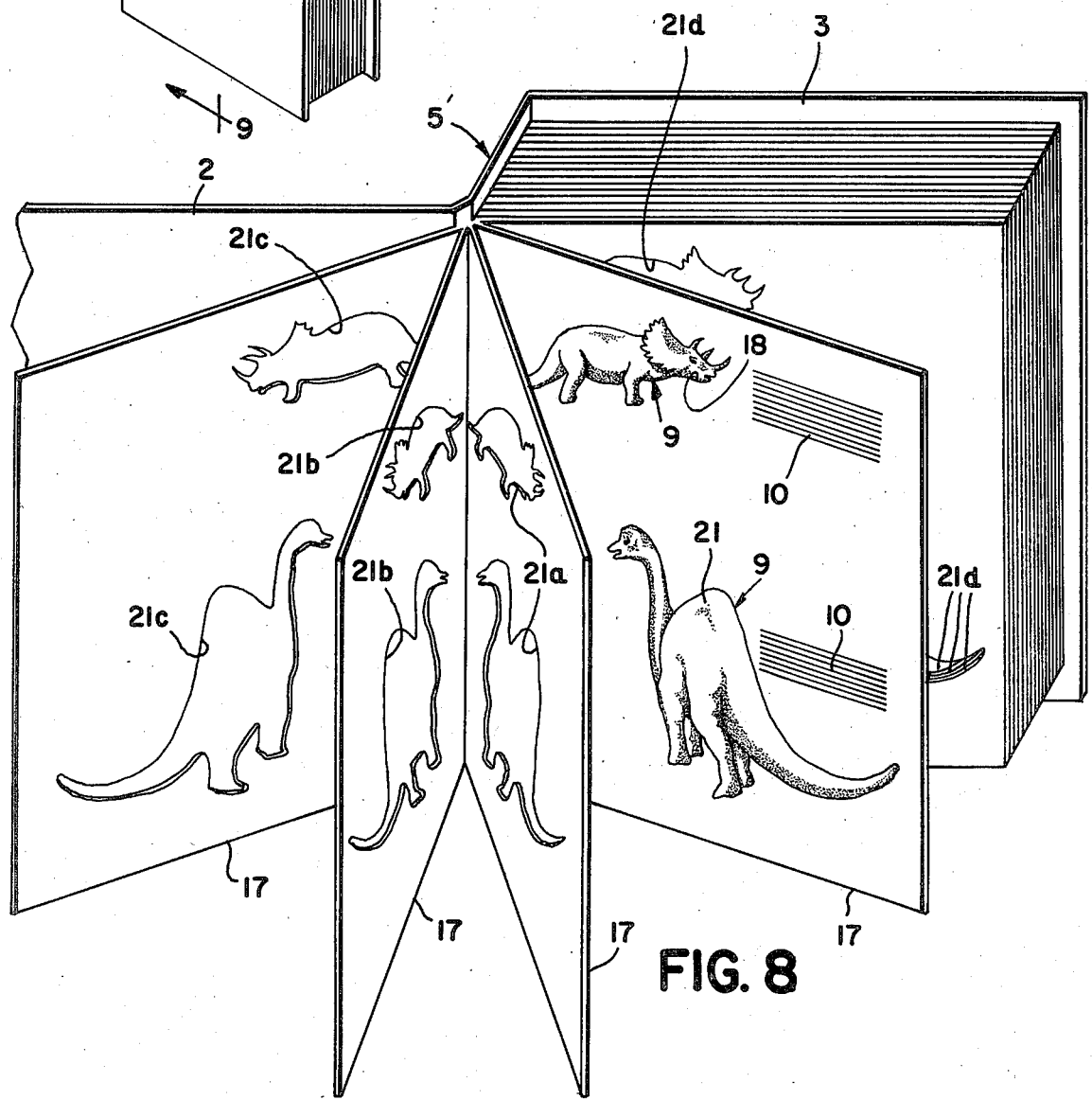
FIG. 7
FIG. 8

BOOK WITH REMOVABLE THREE DIMENSIONAL FIGURINES

BACKGROUND OF THE INVENTION

This invention relates generally to the field of books, and more particularly, pertains to a book designed to accommodate three dimensional figures within its pages. The figures serve to complement printed material contained on the pages to thereby enhance the learning process. The figures are removable from the pages, thereby allowing their use both as individual toys or for a learning by association process created when a given figure is matched with a given written passage and reinserted within its respective page.

It is well recognized that reading and learning processes are enhanced when the reader's interest is maximized in some manner. This is particularly true with children, for whom this invention is primarily designed. For example, when learning is made entertaining in some manner, a child is more likely to want to learn. This also creates the effect of increasing the child's attention span as that learning process progresses. Since children have a natural attraction for toys and small physical objects, the present invention provides a form of entertainment which is intended to cause the child to want to read and, in the process, to want to learn.

Learning can also be enhanced when reinforced by a subsequent, somewhat repetitive exercise. By employing the present invention, re-learning by association reduces the amount of information forgotten as a normal function of the memory. Such reinforced learning is provided in the present invention by allowing the toy figures to be removed from the pages in which they are found. These figures may then be used as toys in the usual manner. The child can use his or her imagination in conjunction with the newly acquired knowledge which is printed on the page to create his own games or stories, thereby enhancing retention of knowledge from the initial reading associated with the toy. Further enforcement is provided by the child's re-insertion of the figures within the pages of the book at the appropriate locations of the printed text. This also facilitates relearning by the resulting interaction between physical object and printed text.

The present invention is believed to maximize this enforcement process by utilizing three dimensional figures, which are also suitable for separate use as toys, as part of the printed text. These three dimensional figures serve to maximize interest beyond that which is normally generated by picture books by adding a new dimension to the reading process.

Prior workers in the art have been interested in developing story or educational books for children which include removable features. For example, U.S. Pat. No. 2,946,137 shows a story book wherein figures can be removed from one page and then placed onto another page with corresponding text. In this disclosure, the figurines do not extend completely through the page, but rather are removably secured to the surface of the page by pressure sensitive adhesive.

In U.S. Pat. No. 556,467, a picture book having removable blocks is disclosed. U.S. Pat. No. 2,538,085 shows a story book block set wherein apertures are provided in the baffle to permit blocks to be arranged therein.

A child's book is described in U.S. Pat. No. 2,548,043 wherein the pages have oval-shaped cut-outs which align when the book is closed. A three dimensional object is movably retained and is shifted as each page is turned. The object is supported on a post and is not readily removable from the book.

These prior developments all relate generally to the combination of a book with a three dimensional object, but none is directed specifically to the concept of employing a removable figurine with a book in a manner to achieve the reinforced learning possible with the present invention.

SUMMARY OF THE INVENTION

This invention relates generally to a book designed to house three dimensional figurines, within the pages of the book. The figurines or figures generally relate to the printed subject matter contained within the book. In the preferred embodiment, the figures are so placed within the pages of the book as to allow them to be easily removed. After removal, the figurines may be used either as toys in the usual manner or as objects useful for memory enhancement by learning reinforcement.

The book itself is designed to simulate an ordinary printed text, comprising the usual cover, printed pages and back. The essential difference between the book of this invention and a standard text lies within the design of its pages. Each page, in addition to printed material, may also be provided with one or several configured openings within which three dimensional figurines are press fitted to be retained within the confines of that page. This may be done in several different ways as more fully described below. The figures may be withdrawn from the book by removing them from the page which contains them by lifting them out of their respective receptacles or by pushing or punching them sufficiently to overcome the frictional engagement with the page.

The figures are so designed and constructed to make them suitable as toys, preferably as three dimensional, self standing figurines whereby they can either be associated with printed material in a book or optionally may be utilized apart from the printed text. When the user wishes to discontinue the use of the figurines after playing with them as toys, they may be re-inserted within the pages from which they came by simply inserting the proper figure into its corresponding, conforming slot within a page. The removable figures thereby serve a dual function of providing an interesting toy for a child in addition to also enhancing learning by association with respect to the printed material to which the figurine pertains.

It is therefore an object of the present invention to provide an improved book with removable, three dimensional figurines. It is another object of this invention to provide a novel book which contains removable, molded figures within its pages which serve as three dimensional illustrations to enhance and reinforce the printed material provided.

It is another object of this invention to provide a novel book housing three dimensional figures which are removable from the pages in which they are mounted for use apart from the printed page either as toys or as teaching aids.

It is still another object of this invention to provide a novel book which provides learning enhancement by reinforcement, created by the association of molded figures and printed text, when the removed figures are replaced within the text in recesses which correspond to their shape and the subject matter to which they pertain.

It is still another object of this invention to provide a novel book which is so designed to capture and maintain the interest of a child reader thereby serving to create an interest in learning in that child and to enhance the learning process.

It is another object of this invention to provide a novel book with removable three dimensional figurines that is inexpensive in manufacture, simple in design and trouble free when in use.

These objects and others will become apparent to those skilled in the art from the following disclosure of the preferred embodiment of the invention taken in conjunciton with the accompanying drawings wherein like reference characters refer to similar parts throughout the several views and in which:

BRIEF DESCRIPTION OF THE DRAWINGS

FIG. 1 is a perspective view of the book of the present invention in closed position;

FIG. 2 is an enlarged perspective view of a first embodiment of the book of FIG. 1 in open position showing figurines retained within pages and illustrating one figurine removed from a page;

FIG. 4 is a perspective view of a second embodiment of a book in closed position;

FIG. 5 is an enlarged perspective view of the second embodiment of the book of FIG. 4 in open position showing figurines retained within pages and illustrating one figurine removed from a page;

FIG. 6 is an enlarged sectional view taken along line 6—6 in FIG. 4, looking in the direction of the arrows;

FIG. 7 is a perspective view of a third embodiment of a book in closed position;

FIG. 8 is an enlarged perspective view of the third embodiment of the book of FIG. 7 in open position showing figurines within the pages; and FIG. 9 is an enlarged sectional view taken along line 9—9 in FIG. 7, looking in the direction of the arrows.

DESCRIPTION OF THE PREFERRED EMBODIMENT OF THE INVENTION

Figure 3:
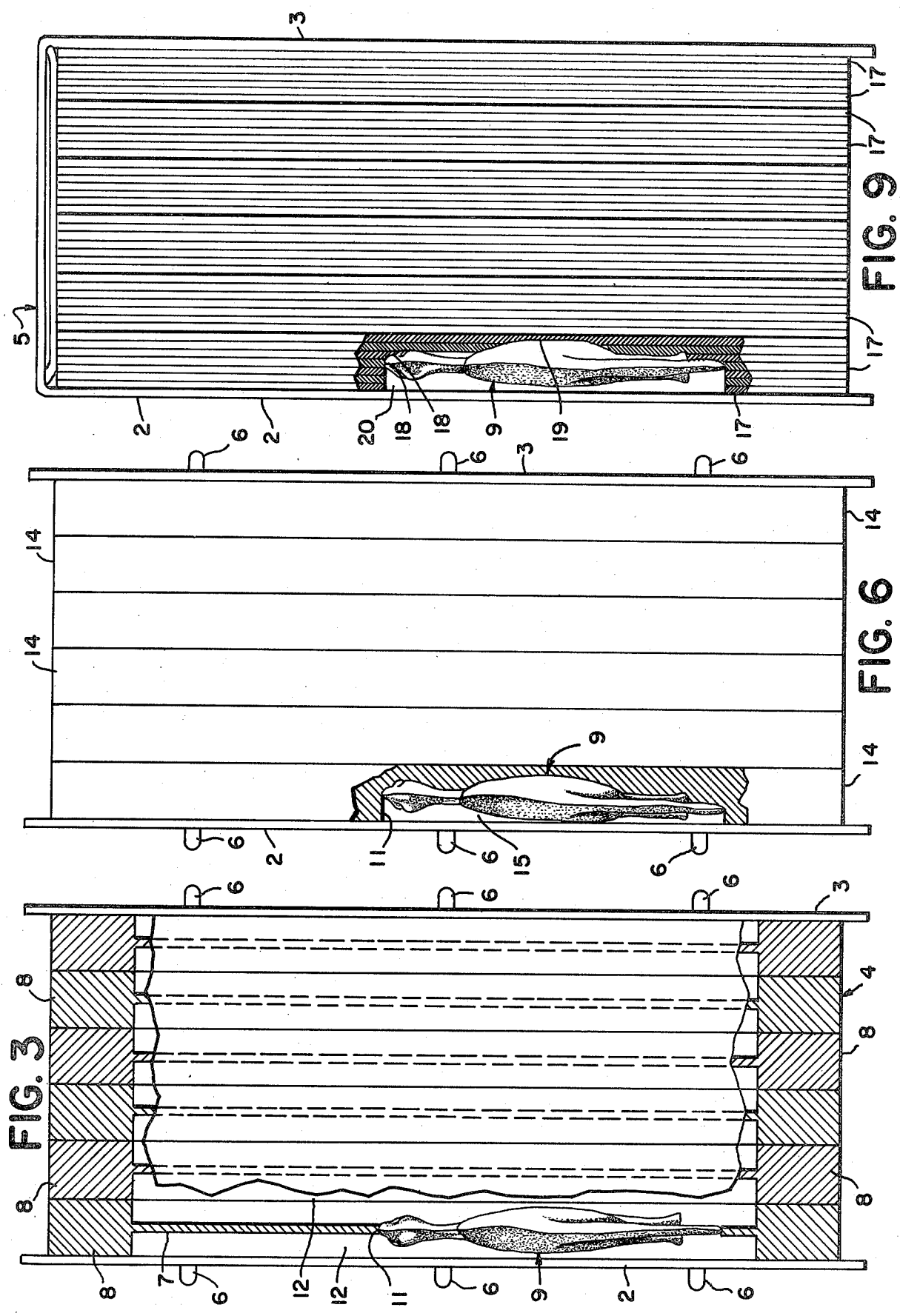
FIG. 3 is an enlarged sectional view taken along line 3—3 in FIG. 1; looking in the direction of the arrows.

Although specific terms are used in the following description for the sake of clarity, these terms are intended to refer only to the particular structure of the invention selected for illustration in the drawings, and are not intended to define or limit the scope of the invention.

Referring now to the drawings, FIG. 1 shows the book 1 as it would generally appear to the reader in its closed position. The book generally comprises a front cover 2, a rear cover 3, a variable number of pages 4 and a binding means 5 combining to form a book of any desired, usual dimension.

The front cover 2 may consist of any material generally used for the outer shell of a book or binder including but not limited to paper, cardboard, fabric or leather. The rear cover 3 may be constructed similarly to the front cover 2. Either or both covers may be provided with printed material, listing such items as title, author, publisher, etc., in the usual manner.

The binding means 5 is illustrated as a series of rings 6, which are conventionally used to form binders and the like and which serve to retain both the covers and the pages between those covers. This binding means 5 could, of course, be any conventional means known to the art of bookbinding, such binding means generally being selected to closely simulate a conventional book or text and as may be required for binding and turning pages of suitable thickness to receive and retain three dimensional figurines therewithin.

As shown in FIGS. 2 and 3, the pages 4 generally comprise a thin, flat area 7 surrounded by a frame or peripheral flange 8, which combine to house a molded figurine or figure 9. The flanges 8 of adjacent pages 4 abut to define a central cavity 12 between the adjacent pages 4. The cavity should be deep enough to accommodate one-half the thickness of a figurine 9. As best seen in FIG. 3, the flat area 7 medially engages the peripheral flange 8 whereby the flange extends in thickness an equal distance from both the front and back surfaces of the flat area 7. Accordingly, the thickness of the cavity 12 will be equal to twice the thickness that a flange extends from a front or back surface, or approximately equal to the total thickness of a flange 8. The pages 4 may also contain printed material 10 in any area not cut away in a configured recess 11 of size and shape to functionally hold or engage a molded FIG. 9 as will be explained more fully below. Additional pages similar to the framed pages 4 but not having cut out areas 11, as would ordinarily be the case, may also be placed between the pages 4 where only printed material is to be displayed. These additional pages may be bound as part of the book, in the conventional manner.

The peripheral frame 8 may be constructed of any material capable of use in a book or binder such as plastic, cardboard, wood or metal, the only limitations being cost and weight. The flat area 7 may be made of a plastic, cardboard or wood. The frame 8 and the flat area 7 may be separate and mounted as a picture and frame, or may be formed of a single piece of material depending upon the given application. It is contemplated that the pages could be fabricated from paper, low density polyethylene, polypropylene or foamed versions of the plastic materials. Paper mache could also be employed. The framing flanges 8 may be integrally formed or may be separate and could be produced from similar material by known processes such as compression molding, vacuum molding or variations thereof.

The molded FIG. 9 are mounted within the flat area 7 of the pages 4. This is accomplished by cutting out from the flat area 7 a silhouette 11 which is sized and configured to closely conform to the configuration of the molded FIG. 9. The figurine 9 is then held and retained within the silhouette 11 by frictional engaging forces between the respective contacting surfaces of the figurine 9 and silhouette 11. Printed material 10 which would generally complement and describe the molded FIG. 9 adjacent to it, may be placed anywhere within the flat area 7 of the page 4 which is not occupied by a silhouette 11. The relative sizes of the molded FIG. 9, the flat area 7 and the printed material 10 are all variable depending upon the particular application of the invention, subject only to logical limitations of size, construction, support and coherence.

FIG. 3 more clearly illustrates the interaction between the frame 8, flat area 7 and molded FIG. 9. As is illustrated, the frame 8 and flat area 7 may be of a unitary construction. However, as previously mentioned, they may also consist of separate parts in known manner such as a picture in a frame. The peripheral frame 8 should at least be wide enough to house the molded FIG. 9 and should allow closure of the pages 4.

To provide for mounting of the figurines 9 within the flat area 7, silhouettes 11 are cut out of the flat area 7 in a configuration which closely conforms to the shape of a molded FIG. 9 to frictionally engage the FIG. 9 and to hold it in place. It is noteworthy that the figurine 9 extends both above and below the flat area 7. The molded FIG. 9 may be readily removed from the page 4 by pushing or pulling from either side of the page 4. Re-insertion is easily accomplished by pushing the molded FIG. 9 into position within the cutout silhouette provided, where it will remain as a result of friction between it and the peripheral edge of the silhouette 11.

In the several drawings, either one or two molded FIG. 9 per page 4 are illustrated. While two such molded FIG. 9 would be the preferred number of figures to put on a page 4, it is to be understood that a page 4 may accommodate any number of such molded FIG. 9, only limited by the dimensions, construction and strength of a given page 4, depending on the application involved.

FIGS. 4 and 5 show a second embodiment of the invention. As shown in FIG. 4, the configuration of the modified book 13 again simulates a conventional book appearing essentially similar to the book 1 of FIG. 1. The book 13 comprises a front cover 2, rear cover 3 and binding means 5, similar to the book 1 of FIG. 1.

The pages 14 of the book 13, as best seen in FIG. 5, differ from the pages 4 of the book 1 of FIG. 1. Each page 14 in this embodiment is fabricated as a solid page of a uniform width on the same order of magnitude as the peripheral frame 8 of the pages 4. Each page 14 preferably may be constructed of a foamed plastic, such as styrofoam, thick cardboard or wood. Silhouettes 11 may be cut into any page 14 in the size and configuration of the figurine 9 to be contained therein. Frictional force acts to removably hold the molded FIG. 9 in place within the pages 14. Solid pages 14, without any silhouettes 11, or additional conventional pages (both not shown) may also be used as part of the book 13, and can be retained by the binding means 5 selected by the manufacturer. Printed material 10 may be placed at any location on any of the pages 14 not precluded by the silhouettes 11.

FIG. 6 illustrates the mounting technique used to retain the molded FIG. 9 within the pages 14. Each page 14 is of a solid construction, cut away where placement of a molded FIG. 9 is desired. The cavity 15 created by the cut away silhouette 11 is shown to closely conform to one side of the molded FIG. 9 while remaining open to the exterior on the other side of the molded FIG. 9. The molded FIG. 9 may then be placed within the cavity 15 from the top and be retained in position by frictional force existing between the molded FIG. 9 and the edge of the silhouette 11. A modified cavity (not shown) could be cut completely through the page 14 similar to the silhouette 11 to form an opening on both sides of the molded FIG. 9. In this embodiment, the figurine 9 would also be retained in place by frictional engagement of the periphery of the modified opening and the periphery of the figure or figurine 9. All other features of this embodiment would be similar to those of the first configuration described.

A third embodiment of the invention is illustrated in FIGS. 7 and 8. In this embodiment, a modified book 16 is formed comprising a front cover 2, a back cover 3 and a binding means 5', here illustrated as a conventional glued binding. In this configuration, the pages 17 are relatively thin compared to the pages of the first and second embodiments and may be of paper, plastic or cardboard of a thickness generally on the order of 1/16 of an inch. The material of the pages 17 should be of sufficient rigidity and strength to removably retain one or more figurines 9.

The overall effect sought is the same as in the first two embodiments, the differences lying primarily in the method of accommodating the thickness of the FIG. 9. This construction is illustrated in FIGS. 8 and 9 which show the FIG. 9 being supported within a cut out silhouette 18 which is cut into a page 17 of the book 16. A plurality of registered variable silhouettes 21a, 21b, 21c, 21d, etc., are cut into successive pages 17 and combine to form a support bed 19 in which the molded FIG. 9 may be placed. The variable silhouettes 21a, 21b, 21c, 21d in the adjacent pages 17 being cut to conform to the size and configuration of the FIG. 9 at that page. The silhouette in adjacent pages combine to create a cavity 20 (FIG. 9). Retention of the FIG. 9 is accomplished by a cooperation between the support bed 19, the silhouette 18 and the variable silhouettes 21a, 21b, 21c, 21d which serve to hold the molded FIG. 9 in place until removed either by pulling it out of the cavity 20 or by turning the pages 17 until the molded FIG. 9 is free and removable. Insertion is accomplished by the reverse of the aforementioned steps.

Frictional retention of the FIG. 9 may also be provided by a binding page 17 in which the silhouette 18 is formed to the configuration of the FIG. 9. Frictional force between the edges of the silhouette 18 and the FIG. 9 serve to rigidly retain the FIG. 9 in position. This retention may be assured by using either one such binding page 17 or several such binding pages 21 adjacent to the center of the cavity 20 in which the molded FIG. 9 is retained. It is also possible to support the molded FIG. 9 without using any such binding pages 21 due to the cooperation of the support bed 19, the silhouettes 18 and the variable silhouettes 21a, 21b, 21c, 21d. However, the use of binding pages 21 is preferable since they will provide a more rigid support for the FIG. 9.

As in the other embodiments, printed material 10 may be placed in any location not cut away by the silhouettes 18 or the variable silhouettes 21. All other features of this configuration are essentially similar to those disclosed by the first two embodiments.

In order to use the invention, a plurality of figurines 9 may be molded or otherwise formed to three dimensional configuration to simulate any desired character, for example animals, prehistoric animals, storybook characters, historical characters and the like. Preferably, the figurines 9 are designed to be free standing to enhance their appeal as toys.

The figurines can be associated with a page 4 (FIGS. 2 and 3) or a page 14 (FIGS. 5 and 6) by frictionally engaging the figurine within a shaped silhouette 11. As the pages 4 or 14 are turned, the frictional engagement of the periphery of the figurine and the periphery of the silhouette 11 maintains the figurine within the cavity 12 or 15 provided therefor. The printed material 10 can be read to describe the figurine for educational purposes. The figurine 9 can be easily removed from association with a page 4, 14, simply by pressing the figurine relating to the page forewardly or rearwardly sufficiently to overcome the frictional engaging forces.

After removal from the page 4, 14, the figurine can be used as a conventional play toy or for demonstration purposes to aid the learning process. When desired, the figurine can be reassociated with the page 4, 14 and can again be frictionally engaged in a silhouette 11. To enhance the learning process, it is noteworthy that the configured outline of the silhouette conforms to outline of the periphery of the figurines, thereby requiring that the proper figurine be associated with its designed cut out area and none other. The learning process can be reinforced thereby to emphasize to the student the information conveyed by the system.

It may therefore be seen that the above disclosed invention serves well to accomplish the objects previously stated. It may also be seen that the above-described invention may be embodied in other specific forms in addition to those above disclosed and therefore the disclosure made should be interpreted in an illustrative and not a limiting sense.

What is claimed is:

1. A book which comprises a plurality of pages each having a relatively thin, flat area at least partly surrounded by a peripheral frame, the flat area being provided with a cut away area formed to closely approximate the configuration of an object, and a three dimensional object of width greater than the thickness of the flat area, the object being held within the confines of the cut away area by frictional force between the object and the edge of the cut away area, whereby the object is retained within the page, and the object being adapted for subsequent removal from and reinsertion into the page, the peripheral frame being of greater thickness than the width of the object; and wherein the pages are adapted to fold together with adjacent portions of the peripheral frames in contact respectively.

2. The book of claim 1 wherein the flat area and the frame of each page are formed of plastic.

3. The book of claim 1 wherein the adjacent pages define therebetween a cavity, wherein a portion of the object is retained in the cavity.

4. The book of claim 3 wherein the cavity is equal in thickness to twice the thickness that a frame extends from a surface of the flat area.

5. A book which comprises
a plurality of relatively thin, flat pages, at least some of which are provided with registered cut away areas, which areas are variably configured to form a cavity suitable to receive therein an object, the cavity being formed to closely approximate the configuration of the object;
a three dimensional object, the object being held within the confines of the cavity by frictional force between the object and the periphery of the cavity, the object being greater in thickness than a plurality of pages,
at least one of said thin pages being configured to abut the object at its periphery to provide frictional retention of the object within the cavity formed in the series of thin pages.

6. The book of claim 5 wherein the plurality of pages are paper.

7. The book of claim 5 wherein the plurality of pages are plastic.

8. The book of claim 5 wherein the plurality of pages are cardboard.

9. The book of claim 5 wherein the object is formed of molded plastic.

10. The book of claim 9 wherein the object is a free standing figurine.

* * * * *